(12) United States Patent
Yoshida et al.

(10) Patent No.: US 7,326,485 B2
(45) Date of Patent: Feb. 5, 2008

(54) FUEL CELL WITH A SEAL TIGHTLY IN CONTACT WITH AN ELECTRODE FOR PREVENTING LEAKAGE OF A REACTANT GAS

(75) Inventors: Hiromichi Yoshida, Tochigi-ken (JP); Daisuke Wachi, Tochigi-ken (JP); Masahiro Mohri, Utsunomiya (JP); Yosuke Fujii, Tochigi-ken (JP); Narutoshi Sugita, Utsunomiya (JP); Shuhei Goto, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 599 days.

(21) Appl. No.: 10/672,672

(22) Filed: Sep. 25, 2003

(65) Prior Publication Data

US 2004/0115509 A1    Jun. 17, 2004

(30) Foreign Application Priority Data

Sep. 25, 2002 (JP) .............................. 2002-279203

(51) Int. Cl.
*H01M 2/08* (2006.01)
(52) U.S. Cl. ........................................ 429/36
(58) Field of Classification Search .................. 429/12, 429/34, 35, 36
See application file for complete search history.

(56) References Cited

U.S. PATENT DOCUMENTS

| | | |
|---|---|---|
| 2001/0044042 A1 | 11/2001 | Inoue et al. |
| 2002/0028370 A1 * | 3/2002 | Suenaga et al. ............... 429/35 |
| 2002/0045084 A1 | 4/2002 | Fujii et al. |
| 2002/0051902 A1 * | 5/2002 | Suenaga et al. ............... 429/35 |
| 2003/0003342 A1 * | 1/2003 | Sugita et al. .................. 429/35 |
| 2004/0062967 A1 * | 4/2004 | Chaix ........................... 429/32 |

FOREIGN PATENT DOCUMENTS

| | | |
|---|---|---|
| CA | 2430083 A1 | 5/2002 |
| CA | 2437431 A1 | 8/2002 |
| CA | 2437835 A1 | 9/2002 |
| GB | 2323700 | 9/1998 |
| JP | 2000-323156 | 11/2000 |
| JP | 2001-319667 | 11/2001 |
| JP | 2002-124275 | 4/2002 |
| JP | 2002-231272 * | 8/2002 |
| WO | WO-02/056407 A1 | 7/2002 |

OTHER PUBLICATIONS

Japanese Office Action for Application No. 2002-279203, dated Jul. 18, 2006.
Canadian Office Action for Application No. 2,442,436, dated Sep. 8, 2006.
European Search Report for Application No. 03256048.4, dated Dec. 13, 2006.

* cited by examiner

*Primary Examiner*—Patrick Joseph Ryan
*Assistant Examiner*—Thomas H. Parsons
(74) *Attorney, Agent, or Firm*—Lahive & Cockfield, LLP; Anthony A. Laurentano, Esq.

(57) ABSTRACT

A fuel cell includes a membrane electrode assembly and first and second separators for sandwiching the membrane electrode assembly. A serpentine oxygen-containing gas flow field is formed on a surface of the first separator. A seal member is provided around the oxygen-containing gas flow field, i.e., around the anode. Filling seals are provided in a clearance between the seal member and the cathode at positions where the leakage of an oxygen-containing gas is likely to occur.

8 Claims, 7 Drawing Sheets

PRIOR ART

FUEL CELL WITH A SEAL TIGHTLY IN CONTACT WITH AN ELECTRODE FOR PREVENTING LEAKAGE OF A REACTANT GAS

BACKGROUND OF THE INVENTION

1. Field of the Invention

The present invention relates to a fuel cell including an electrolyte electrode assembly interposed between a pair of separators. The electrolyte electrode assembly includes a pair of electrodes, and an electrolyte interposed between the electrodes. A reactant gas supply passage and a reactant gas discharge passage extend through the separators in a stacking direction. A reactant gas flow field is connected between the reactant gas supply passage and the reactant gas discharge passage, and supplies a reactant gas to the electrode.

2. Description of the Related Art

For example, a solid polymer electrolyte fuel cell employs a membrane electrode assembly (MEA) which comprises two electrodes (anode and cathode) and an electrolyte membrane interposed between the electrodes. The electrolyte membrane is a polymer ion exchange membrane. The membrane electrode assembly is interposed between separators. The membrane electrode assembly and the separators make up a unit of the fuel cell for generating electricity. A predetermined number of fuel cells are stacked together to form a fuel cell stack.

In the fuel cell, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to produce water.

Figure 7:
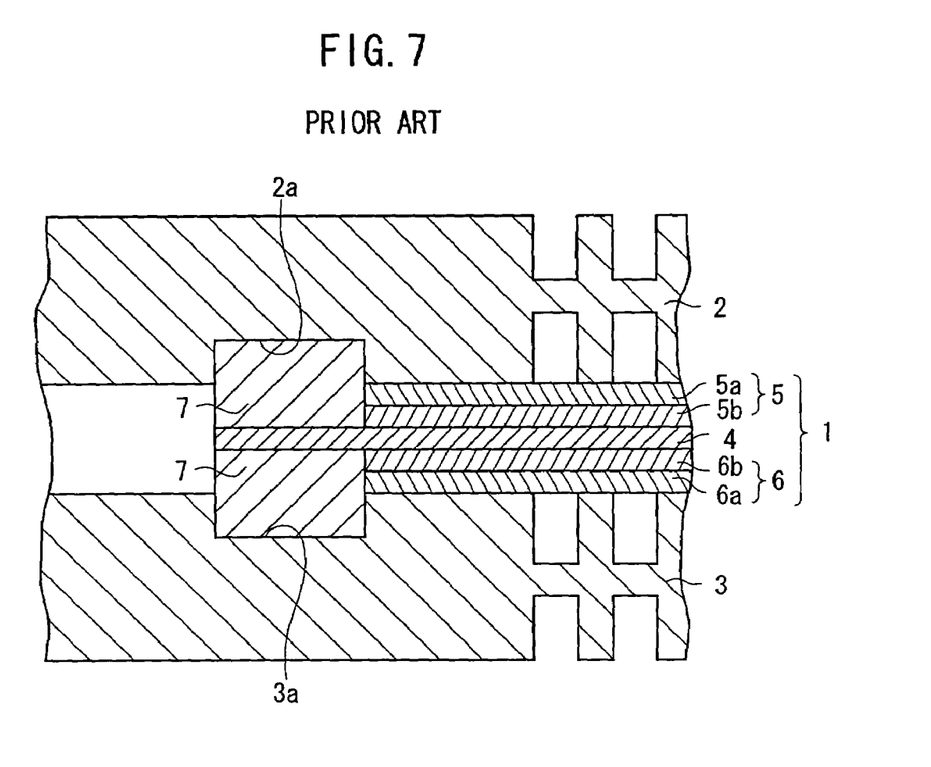
FIG. 7 is a cross sectional view showing main components of a conventional fuel cell.

In the fuel cell, it is desirable to improve the sealing characteristics of the membrane electrode assembly and the separators. For example, Japanese laid-open patent publication No. 2001-319667 discloses a fuel cell directed to improve the sealing characteristics. As shown in FIG. 7, the fuel cell includes a membrane electrode assembly 1, and first and second separators 2, 3. The membrane electrode assembly 1 includes an anode 5, and a cathode 6, and a solid polymer electrolyte membrane 4 interposed between the anode 5 and the cathode 6. The anode 5 includes a gas diffusion layer 5a and an electrode catalyst layer 5b. The cathode 6 includes a gas diffusion layer 6a and an electrode catalyst layer 6b. The solid polymer electrolyte membrane 4 has an extension extending outwardly from the cathode 5 and the anode 6. The first and second separators 2, 3 have grooves 2a, 3a, respectively, at a position corresponding to the extension of the solid polymer electrolyte membrane 4. Liquid seals 7 are provided in the grooves 2a, 3a, respectively. The liquid seals 7 are made of a heat curing fluoride or silicone. The liquid seals 7 are applied in the grooves 2a, 3a in a liquid state. In the liquid state, the liquid seals 7 have a certain viscosity. In use, the liquid seals 7 are hardened to have a certain elasticity in a solid state. The liquid seals 7 are tightly in contact with the extension of the solid polymer electrolyte membrane 4, and end surfaces of the gas diffusion layers 5a, 6a, and the electrode catalyst layers 5b, 6b.

However, it is difficult to ensure that the liquid seals 7 provided around the cathode 5 and the anode 6 are tightly in contact with the end surfaces of the gas diffusion layers 5a, 6a, and the electrode catalyst layers 5b, 6b due to the factor such as the tolerance in producing, and assembling the components. If there is a clearance between the liquid seals 7 and the gas diffusion layers 5a, 6a, the reactant gas may leak into the clearance. Some of the reactant gas such as an oxygen-gas and a fuel gas leaks into the reactant gas discharge passage through the clearance, and is not supplied to electrode surfaces of the cathode 5 and the anode 6. Consequently, the power generation can not be performed efficiently.

Though not illustrated, a coolant for cooling the electrode surface may also leak into a coolant flow field through the clearance around the electrode surface. Since the coolant does not flow along the electrode surface, the electrode surface is not cooled by the coolant efficiently.

SUMMARY OF THE INVENTION

A general object of the present invention is to provide a fuel cell with a simple structure in which a fluid such as a reactant gas does not leak out of a predetermined flow passage, and the desired power generation performance is maintained.

According to the present invention, an electrolyte electrode assembly includes a pair of electrodes and an electrolyte interposed between the electrodes. Separators sandwiches the electrolyte electrode assembly. A reactant gas supply passage and a reactant gas discharge passage extend through the separators in a stacking direction. At least one of the separators has a reactant gas flow field connected between the reactant gas supply passage and the reactant gas discharge passage for supplying a reactant gas to the electrode. A seal member is provided around the electrode for sealing the reactant gas flow field, the reactant gas supply passage, and the reactant gas discharge passage. A filling seal is provided tightly in contact with at least an outer end surface of the electrode for preventing leakage of the reactant gas at an outer region of the electrode.

In the fuel cell according to the present invention, the reactant gas does not flow through the clearance between the electrode and the seal member. Therefore, the reactant gas is reliably supplied to the surface of the electrode. Thus, the reactant gas is utilized efficiently, and the power generation performance is improved effectively. Further, the present invention is carried out simply by providing the filling seal tightly in contact with at least the electrode. Thus, the fuel cell has a simple structure, and can be produced economically.

The filling seal may be provided near the reactant gas supply passage and near the reactant gas discharge passage. Thus, sealing is reliably performed near the reactant gas supply passage and the reactant gas discharge passage, i.e., at the positions where leakage of the reactant gas is likely to occur. Leakage of the reactant gas is greatly reduced with the simple structure.

The reactant gas flow field may include at least one U-Turn region, and the filling seal may be provided near the U-Turn region for preventing leakage of the reactant gas from the U-Turn region. Thus, even if the reactant gas flow field comprises a serpentine reactant gas flow passage, leakage of the reactant gas is reliably prevented with the simple structure.

At least one of the separators may have a coolant flow field for supplying a coolant to cool the electrode. An additional filling seal may be provided in a part of a clearance between the coolant flow field and the seal member for preventing leakage of the coolant into the clearance.

The coolant does not flow directly flow from the coolant supply passage to the coolant discharge passage. The coolant flows along the coolant flow field suitably. Thus, the efficiency in cooling the electrode surface is improved with the simple structure, and the power generation is performed economically.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
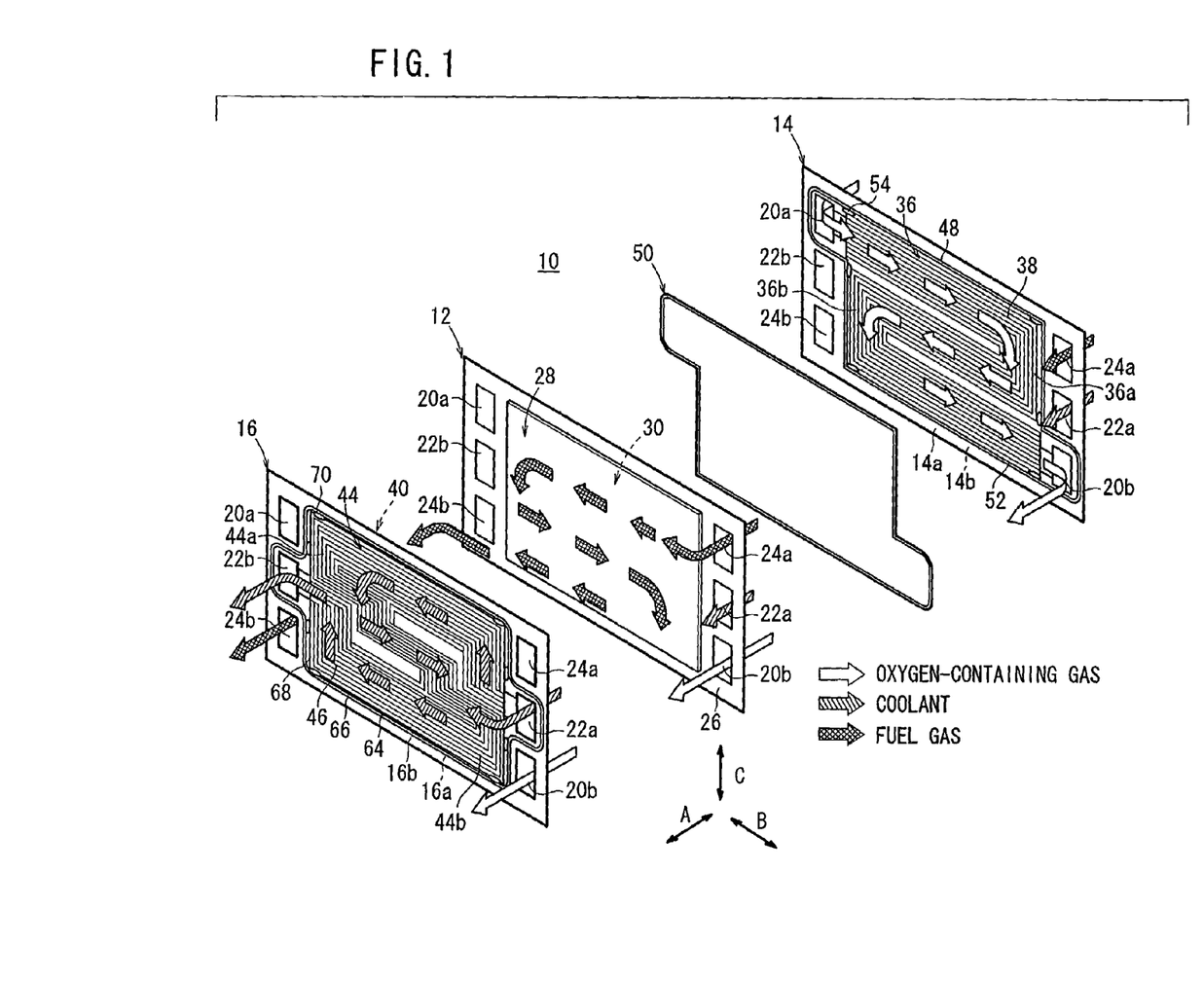
FIG. 1 is an exploded perspective view showing main components of a fuel cell according to a first embodiment of the present invention.
Figure 2:
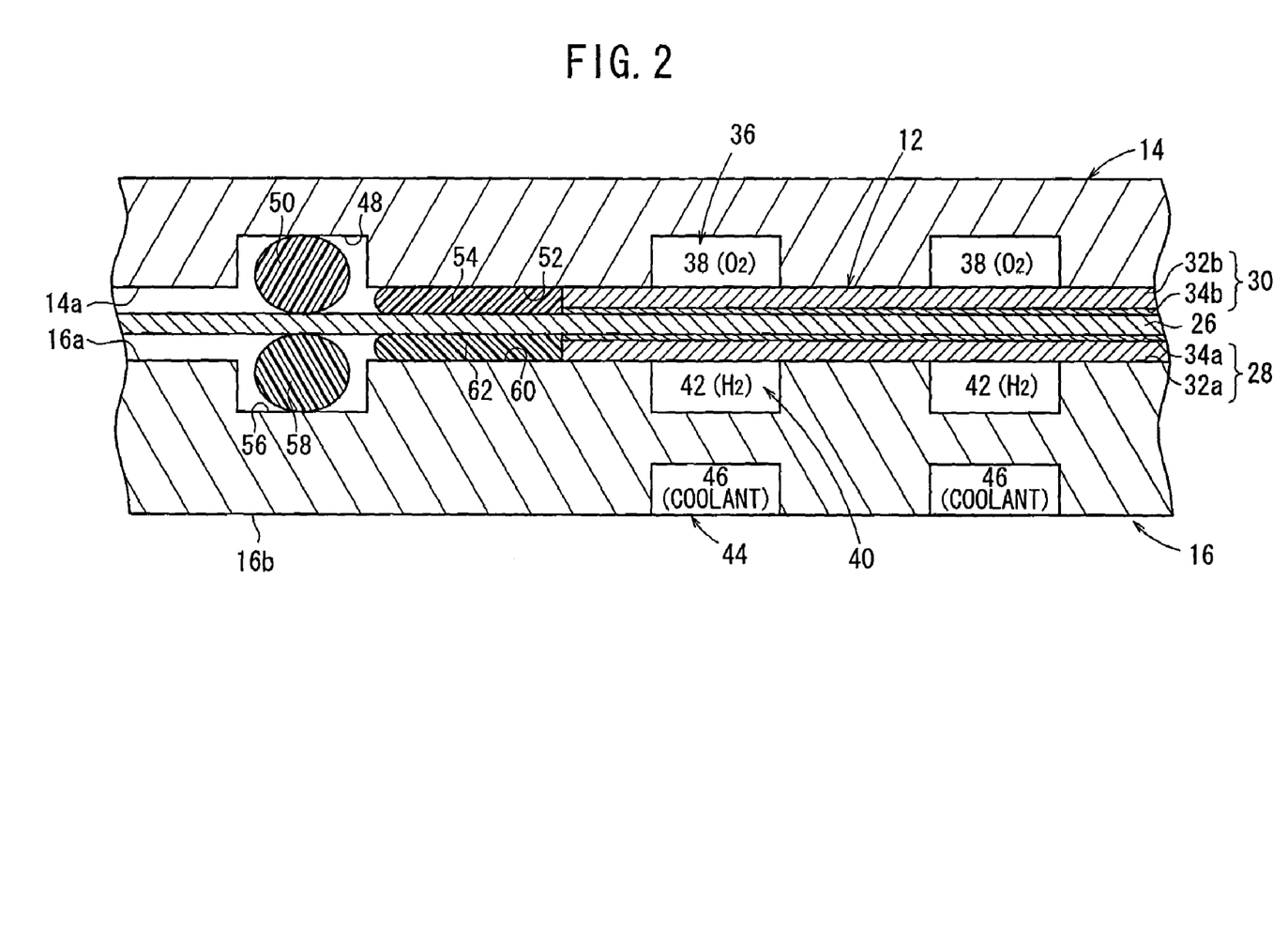
FIG. 2 is a cross sectional view showing the main components of the fuel cell.

FIG. 1 is an exploded perspective view showing main components of a fuel cell 10 according to a first embodiment of the present invention. FIG. 2 is a cross sectional view showing the main components of the fuel cell 10.

The fuel cell 10 includes a membrane electrode assembly (electrolyte electrode assembly) 12, and first and second separators 14, 16 for sandwiching the membrane electrode assembly 12. As shown in FIG. 1, at one end of the fuel cell 10 in a horizontal direction indicated by an arrow B, an oxygen-containing gas supply passage (reactant gas supply passage) 20a for supplying an oxygen-containing gas, a coolant discharge passage 22b for discharging a coolant, and a fuel gas discharge passage (reactant gas discharge passage.) 24b for discharging a fuel gas such as a hydrogen-containing gas are arranged in a vertical direction indicated by an arrow C. The oxygen-containing gas supply passage 20a, the coolant discharge passage 22b, and the fuel gas discharge passage 24b extend through the fuel cell 10 in a stacking direction indicated by an arrow A.

At the other end of the fuel cell 10 in the direction indicated by the arrow B, a fuel gas supply passage (reactant gas supply passage) 24a for supplying the fuel gas, a coolant supply passage 22a for supplying the coolant, and an oxygen-containing gas discharge passage (reactant gas discharge passage) 20b for discharging the oxygen-containing gas are arranged in the direction indicated by the arrow C. The fuel gas supply passage 24a, the coolant supply passage 22a, and the oxygen-containing gas discharge passage 20b extend through the fuel cell 10 in the direction indicated by the arrow A.

The membrane electrode assembly 12 comprises an anode 28, a cathode 30, and a solid polymer electrolyte membrane 26 interposed between the anode 28 and the cathode 30. The solid polymer electrolyte membrane 26 is formed by impregnating a thin membrane of perfluorosulfonic acid with water, for example.

As shown in FIG. 2, each of the anode 28 and the cathode 30 has a gas diffusion layer (porous diffusion member) 32a, 32b, and an electrode catalyst layer 34a, 34b of platinum alloy supported on porous carbon particles. The carbon particles of the electrode catalyst layer 34a, 34b are deposited uniformly on the surface of the gas diffusion layer 32a, 32b. The electrode catalyst layer 34a of the anode 28 and the electrode catalyst layer 34b of the cathode 30 are fixed to both surfaces of the solid polymer electrolyte membrane 26, respectively.

Figure 3:
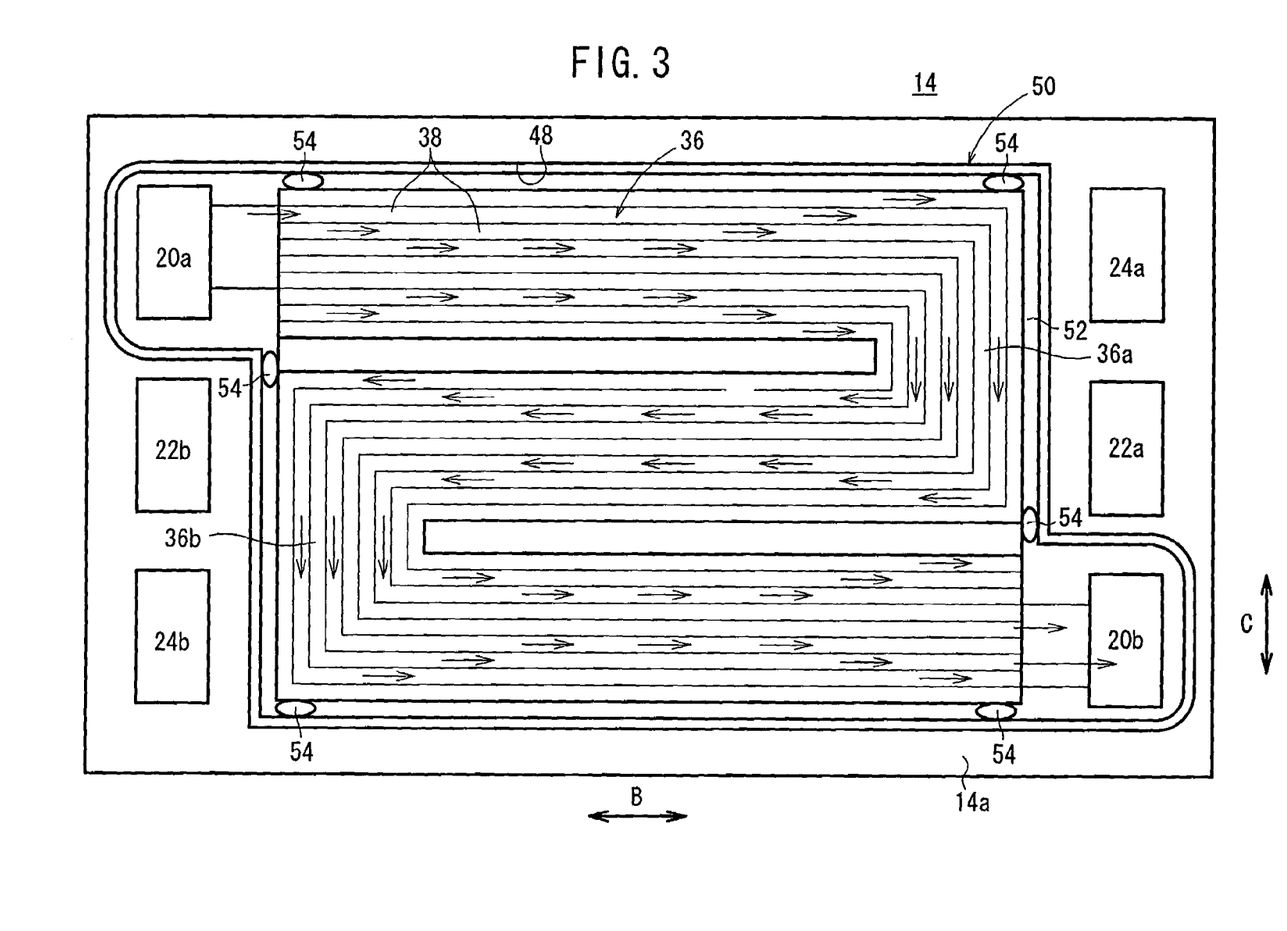
FIG. 3 is a front view showing a first separator of the fuel cell.

As shown in FIG. 1, the first separator 14 has an oxygen-containing gas flow field (reactant gas flow field) 36 on its surface 14a facing the membrane electrode assembly 12. As shown in FIG. 3, the oxygen-containing flow field 36 comprises a plurality of oxygen-containing gas grooves 38 extending in a serpentine pattern including two U-Turn regions 36a, 36b for allowing the oxygen-containing gas to flow horizontally back and forth in the direction indicated by the arrow B. and vertically in the direction indicated by the arrow C. The oxygen-containing gas grooves 38 of the oxygen-containing gas flow field 36 are connected to the oxygen-containing gas supply passage 20a at one end, and connected to the oxygen-containing gas discharge passage 20b at the other end.

Figure 4:
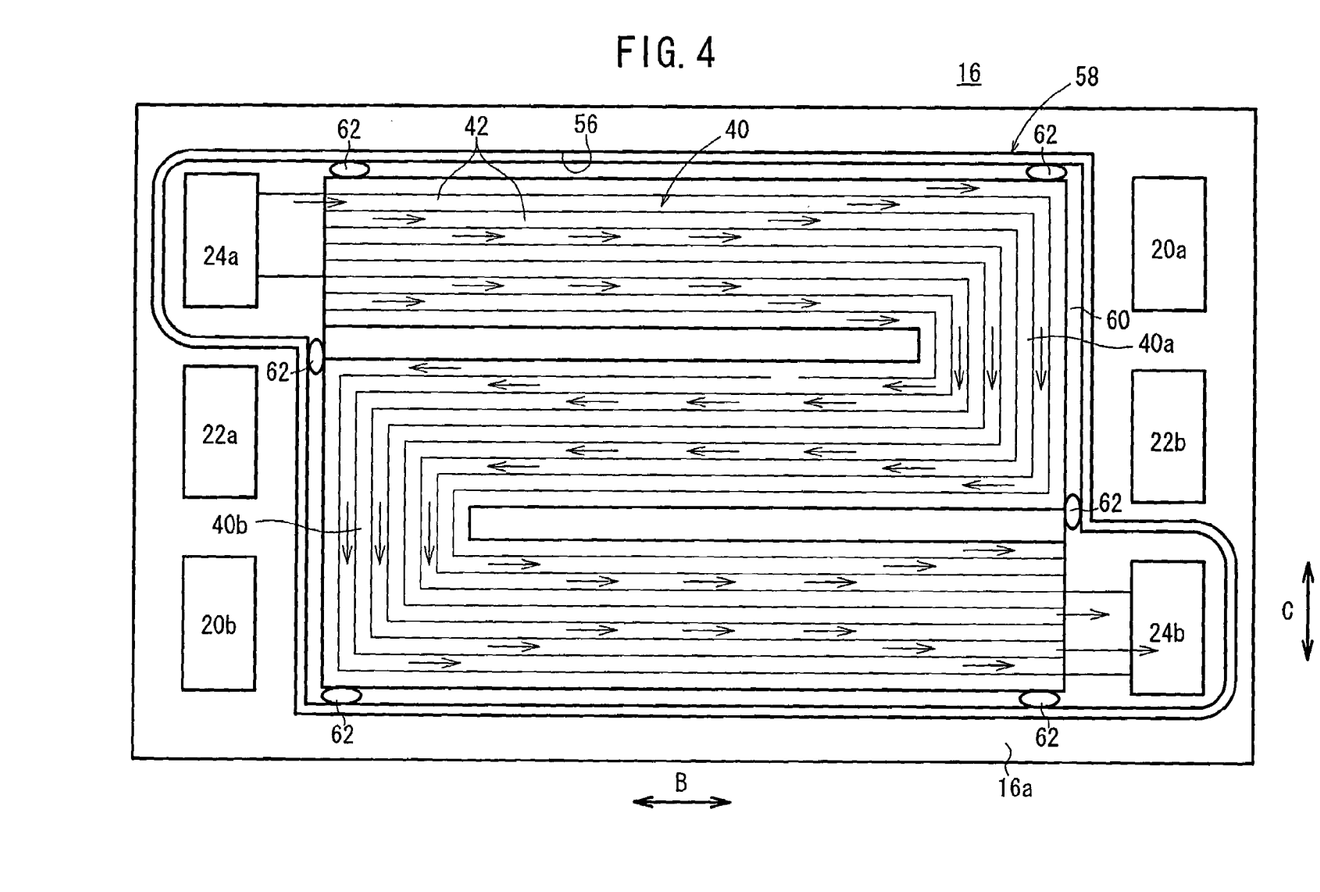
FIG. 4 is a front view showing a second separator of the fuel cell.

As shown in FIG. 4, the second separator 16 has a fuel gas flow field (reactant gas flow field) 40 on it surface 16a facing the membrane electrode assembly 12. The fuel gas flow field 40 comprises a plurality of fuel gas grooves 42 extending in a serpentine pattern including two U-Turn regions 40a, 40b for allowing the fuel gas to flow horizontally back and forth, and vertically. The fuel gas grooves 42 of the fuel gas flow field 40 is connected to the fuel gas supply passage 24a at one end, and connected to the fuel gas discharge passage 24b at the other end.

As shown in FIGS. 1 and 2, a coolant flow field 44 is formed between a surface 14b of the first separator 14 and a surface 16b of the second separator 16. The coolant flow field 44 comprises a plurality of coolant grooves 46 extending in a serpentine pattern including two U-Turn regions 44a, 44b for allowing the coolant to flow horizontally back and forth, and vertically. The coolant grooves 46 of the coolant flow field 44 is connected to the coolant supply passage 22a at one end, and connected to the coolant discharge passage 22b at the other end.

As shown in FIGS. 1 through 3, a seal groove 48 is formed on the surface 14a of the first separator 14 around the cathode 30, i.e., around the oxygen-containing gas flow field 36, the oxygen-containing gas supply passage 20a, and the oxygen-containing gas discharge passage 20b. A seal member 50 is provided in the seal groove 48. As shown in FIGS. 2 and 3, filling seals 54 are provided at some positions in a clearance 52 between the cathode 30 and the seal member 50 for preventing leakage of the oxygen-containing gas into the clearance 52. The filling seals 54 are tightly in contact with at least the outer end surface of the cathode 30.

The filling seals 54 are liquid seals or solid filling seals, for example. The filling seals 54 are provided at positions where leakage of the oxygen-containing gas is likely to occur. Specifically, the filling seals 54 are provided in the clearance 52 near the oxygen-containing gas supply passage 20a, near the oxygen-containing gas discharge passage 20b, and near the U-Turn regions 36a, 36b.

As shown in FIGS. 2 and 4, a seal groove 56 is formed on the surface 16a of the second separator 16 around the anode 28, i.e., around the fuel gas flow field 40, the fuel gas supply passage 24a, and the fuel gas discharge passage 24b. A seal member 58 is provided in the seal groove 56.

Filling seals 62 are provided at some positions in a clearance 60 between the anode 28 and the seal member 58. The filling seals 62 are tightly in contact with at least the outer end surface of the anode 28. As with the filling seals 54, the filling seals 62 are provided at positions where leakage of the fuel gas is likely to occur. Specifically, the filling seals 62 are provided in the clearance 60 near the fuel gas supply passage 24a, near the fuel gas discharge passage 24b, and near the U-Turn regions 40a, 40b.

As shown in FIG. 1, a seal groove 64 is formed on the surface 16b of the second separator 16 around the coolant flow field 44. A seal member 66 is provided in the seal groove 64. Filling seals 70 are provided at some positions in a clearance 68 between the coolant flow field 44 and the seal member 66. Specifically, the filling seals 70 are provided in the clearance 68 near the coolant supply passage 22a, near the coolant discharge passage 22b, and near the U-Turn regions 44a, 44b.

Next, operation of the fuel cell 10 will be described below. As shown in FIG. 1, an oxygen-containing gas is supplied to the oxygen-containing gas supply passage 20a, and a fuel gas such as a hydrogen-containing gas is supplied to the fuel gas supply passage 24a. Further, a coolant such as pure water, an ethylene glycol or an oil is supplied to the coolant supply passage 22a.

The oxygen-containing gas flows from the oxygen-containing gas supply passage 20a into the oxygen-containing gas flow field 36 formed on the first separator 14, and flows through the oxygen-containing gas grooves 38 in the direction indicated by the arrow B in a serpentine pattern along the cathode 30 of the membrane electrode assembly 12 to induce an electrochemical reaction at the cathode 30. The fuel gas flows from the fuel gas supply passage 24a into the fuel gas flow field 40 formed on the second separator 16, and flows through the fuel gas grooves 42 in the direction indicated by the arrow B in a serpentine pattern along the anode 28 of the membrane electrode assembly 12 to induce an electrochemical reaction at the anode 28.

In the membrane electrode assembly 12, the oxygen-containing gas supplied to the cathode 30, and the fuel gas supplied to the anode 28 are consumed in the electrochemical reactions at the electrode catalyst layers 34a, 34b of the cathode 30 and the anode 28 for generating electricity.

After the oxygen-containing gas is consumed at the cathode 30, the oxygen-containing gas is discharged into the oxygen-containing gas discharge passage 20b, and flows in the direction indicated by the arrow A. Similarly, after the fuel gas is consumed at the anode 28, the fuel gas is discharged into the fuel gas discharge passage 24b, and flows in the direction indicated by the arrow A.

The coolant flows from the coolant supply passage 22a into the coolant flow field 44 between the first separator 14 and the second separator 16, and flows in the direction indicated by the arrow B in a serpentine pattern. After the coolant is used for cooling the membrane electrode assembly 12, the coolant is discharged into the coolant discharge passage 22b.

In the first embodiment, as shown in FIGS. 2 and 3, the oxygen-containing gas flow field 36 comprises a passage of the oxygen-containing gas grooves 38 in the serpentine pattern formed on the surface 14a of the first separator 14, and the seal member 50 is provided in the seal groove 48 around the oxygen-containing gas flow field 36. The filling seals 54 are provided in the clearance 52 between the oxygen-containing gas flow field 36 and the seal member 50, at positions near the oxygen-containing gas supply passage 20a, near the oxygen-containing gas discharge passage 20b, and near the U-turn regions 36a, 36b.

As described above, the filling seals 54 are provided at positions where leakage of the oxygen-containing gas into the clearance 52 is likely to occur. Therefore, the oxygen-containing gas does not flow along the clearance 52, and the oxygen-containing gas is reliably supplied to the electrode surface of the cathode 30. Since the oxygen-containing gas does not flow into the oxygen-containing gas discharge passage 20b through the clearance 52 around the cathode 30, the oxygen-containing gas can be utilized efficiently, and the power generation performance is improved effectively.

The first embodiment of the present invention can be carried out simply by providing the filling seals 54 at positions where leakage of the oxygen-containing gas into the clearance 52 is likely to occur. Thus, the first separator 14 has a simple structure, and can be produced at a low cost.

As shown in FIGS. 2 and 4, as with the oxygen-containing gas flow field 36, the fuel gas flow field 40 comprises a passage of the fuel gas grooves 42 in the serpentine pattern formed on the surface 16a of the second separator 16, and the seal member 58 is provided in the seal groove 48 around the fuel gas flow field 40. Further, the filling seals 62 are provided at positions where leakage of the fuel gas into the clearance 60 is likely to occur.

Therefore, the fuel gas does not leak through the gas diffusion layer 32a into the clearance 60, and does not flow into the fuel gas discharge passage 24b through the clearance 60. The fuel gas is utilized efficiently, and the power generation performance can be improved effectively. The second separator 16 has the advantage as with the first separator 14.

Further, as shown in FIG. 1, the coolant flow field 44 comprises a passage of the coolant grooves 46 in the serpentine pattern formed on the surface 16b of the second separator 16. The seal member 66 is provided around the coolant flow field 44. The filling seals 70 are provided in the clearance 68 between the seal member 66 and the coolant flow field 44 at positions where leakage of the coolant is likely to occur.

Thus, the coolant does not leak into the clearance 68, and flows along the coolant flow field 44 desirably. Consequently, the electrode surfaces of the membrane electrode assembly 12 can be cooled by the coolant efficiently.

Figure 5:
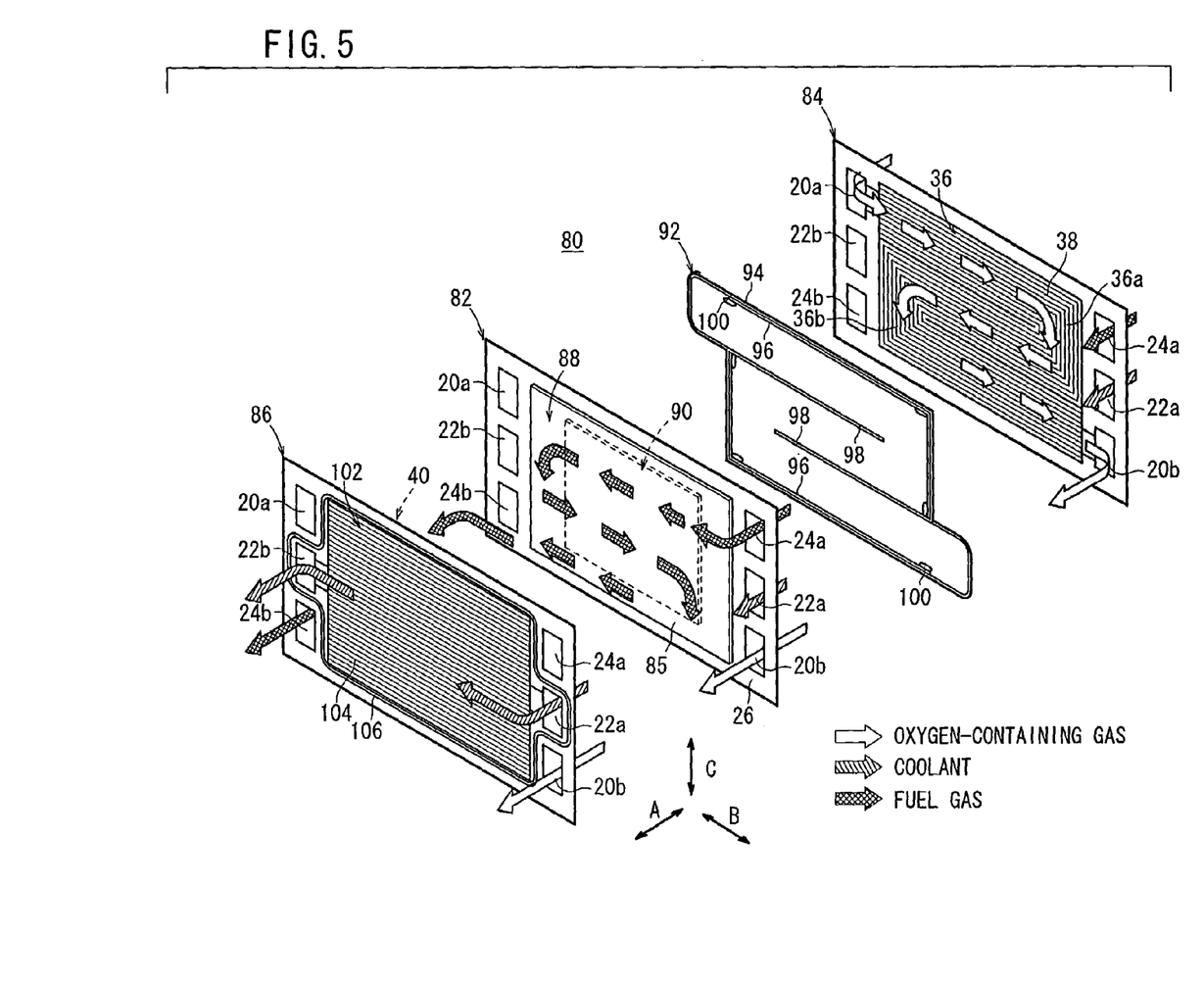
FIG. 5 is an exploded perspective view showing main components of a fuel cell according to a second embodiment of the present invention.
Figure 6:
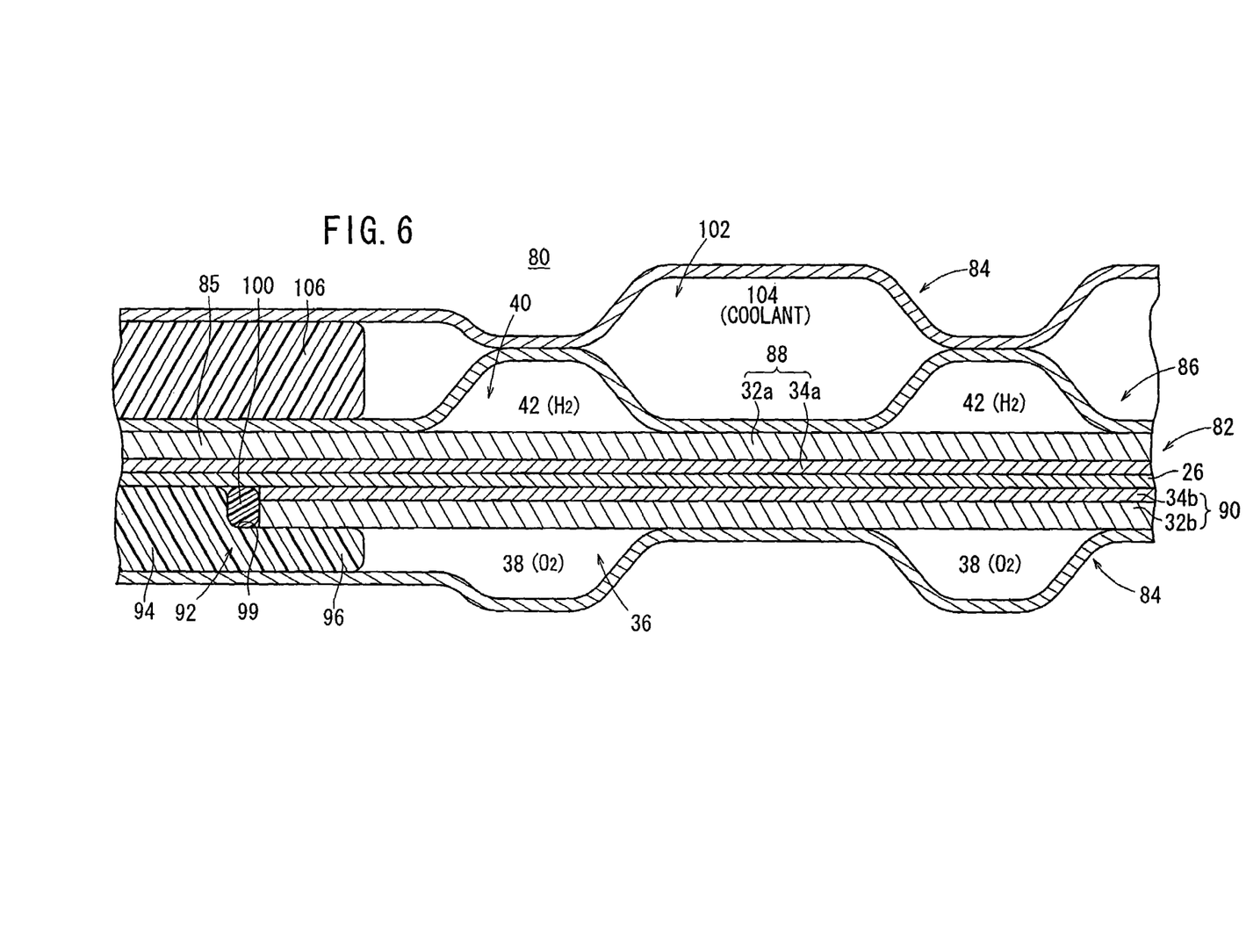
FIG. 6 is a cross sectional view showing the main components of the fuel cell.

FIG. 5 is an exploded perspective view showing main components of a fuel cell 80 according to a second embodiment of the present invention, and FIG. 6 is a cross sectional view showing the main components of the fuel cell 80. The constituent elements that are identical to those of the fuel cell 10 according to the first embodiment are labeled with the same reference numeral, and description thereof is omitted.

The fuel cell 80 includes a membrane electrode assembly (electrolyte electrode assembly) 82, and first and second metal separators 84, 86 for sandwiching the membrane electrode assembly 82. The electrolyte electrode assembly 82 includes an anode 88, a cathode 90, and a solid polymer electrolyte membrane 26 interposed between the anode 88 and the cathode 90. The surface area of the anode 88 is larger than the surface area of the cathode 90. The gas diffusion layer 32a of the anode 88 includes an outer marginal region 85 extending outwardly beyond an outer region of the gas diffusion layer 32b of the cathode 90.

As shown in FIG. 6, a seal member 92 is provided on the first metal separator 84. The seal member 92 may be attached to the first metal separator 84 by heat. The seal member 92 includes a main seal 94 interposed between the solid polymer electrolyte membrane 26 and the first separator 84, corresponding to a position of the outer marginal region 85 of the gas diffusion layer 32a of the anode 88. Further, the seal member 92 includes a flow field wall 96 interposed between the outer region of the gas diffusion layer 32b and the first metal separator 84.

As shown in FIGS. 5 and 6, filling seals 100 are provided at some positions in a clearance 99 between the seal member 92 and end surfaces of the gas diffusion layer 32b and the electrode catalyst layer 34b of the cathode 90. The filling seals 100 prevent leakage of the oxygen-containing gas into the clearance 99. For example, the filling seals are liquid seals or solid filling seals. The filling seals 100 are provided in the clearance 99 at positions where leakage of the oxygen-containing gas is likely to occur, for example, near the oxygen-containing gas supply passage 20a, near the oxygen-containing gas discharge passage 20b, and near the U-turn regions 36a, 36b (see FIG. 5).

As shown in FIGS. 5 and 6, a coolant flow field 102 is formed between the first and second metal separators 84, 86. The coolant flow field 102 comprises a plurality of coolant grooves 104 extending between the coolant supply passage 22a and the coolant discharge passage 22b in the direction indicated by the arrow B. A seal member 106 is inserted between the first metal separator 84 and the second metal separator 86 at a position corresponding to the main seal 94 of the seal member 92. The coolant flow field 102 is sealed air-tight by the seal member 106. The coolant grooves 104 of the coolant flow field 102 is connected to the coolant supply passage 22a at one end, and connected to the coolant discharge passage 22b at the other end inside the seal member 106.

In the second embodiment, the filling seals 100 are provided in the clearance 99 between the seal member 92 and the end surfaces of the gas diffusion layer 32b and the electrode catalyst layer 34b of the cathode 90 at positions near the oxygen-containing gas supply passage 20a, near the oxygen-containing gas discharge passage 20b, and near the U-Turn regions 36a, 36b. The oxygen-containing gas is not discharged through the outer region of the gas diffusion layer 32b of the cathode 90. Thus, the reactant gas is utilized efficiently, and the power generation performance is improved effectively as with the first embodiment.

In the fuel cell according to the present invention, the reactant gas does not flow through the clearance between the electrode and the seal member. Therefore, the reactant gas is reliably supplied to the surface of the electrode. Thus, the reactant gas is utilized efficiently, and the power generation performance is improved effectively. Further, the present invention is carried out simply by providing the filling seal tightly in contact with at least the electrode. Thus, the fuel cell has a simple structure, and can be produced economically.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising:
   an electrolyte electrode assembly including a pair of electrodes and an electrolyte interposed between said electrodes;
   separators for sandwiching said electrolyte electrode assembly, a reactant gas supply passage and a reactant gas discharge passage extending through said separators in a stacking direction, at least one of said separators having a reactant gas flow field connected between said reactant gas supply passage and said reactant gas discharge passage for supplying a reactant gas to one of said pair of electrodes;
   a seal member provided around said one of said pair of electrodes for sealing said reactant gas flow field, said reactant gas supply passage, and said reactant gas discharge passage; and
   a filling seal partially provided at an outer region of said one of said pair of electrodes, said filling seal being provided tightly in contact with at least an outer end surface of said one of said pair of electrodes for preventing leakage of said reactant gas,
   wherein the seal member and the filling seal contact the electrolyte.

2. A fuel cell according to claim 1, wherein said filling seal is provided near said reactant gas supply passage and near said reactant gas discharge passage.

3. A fuel cell according to claim 1, wherein said reactant gas flow field includes at least one U-Turn region, and said filling seal is provided near said U-Turn region for preventing leakage of said reactant gas from said U-Turn region.

4. A fuel cell according to claim 1, wherein a seal groove is formed around said reactant gas flow field, said reactant gas supply passage, and said reactant gas discharge passage;
   said seal member is provided in said seal groove; and
   said filling seal is provided in a part of a clearance between said seal member and said outer end surface of said one of said pair of electrodes.

5. A fuel cell according to claim 1, wherein at least one of said separators has a coolant flow field for supplying a coolant to cool said one of said pair of electrodes;
   an additional filling seal is provided in a part of a clearance between said coolant flow field and said seal member for preventing leakage of said coolant into said clearance.

6. A fuel cell according to claim 5, wherein a coolant supply passage and a coolant discharge passage extend through said separators in said stacking direction; and
   said additional filling seal is provided near said coolant supply passage, and near said coolant discharge passage.

7. A fuel cell according to claim 6, wherein a seal groove is formed around said coolant flow field, said coolant supply passage, and said coolant discharge passage, and said seal member is provided in said seal groove.

8. A fuel cell according to claim 5, wherein said coolant flow field includes at least one U-Turn region, and said additional filling seal is provided near said U-Turn region for preventing leakage of said reactant gas from said U-Turn region.

* * * * *